United States Patent
Stocco et al.

(10) Patent No.: US 10,371,352 B2
(45) Date of Patent: Aug. 6, 2019

(54) LIGHTING DEVICE AND CORRESPONDING METHOD

(71) Applicant: OSRAM GmbH, Munich (DE)

(72) Inventors: Antonio Stocco, Piombino Dese (IT); Alessio Griffoni, Fossò (IT); Lorenzo Baldo, Giavera del Montello (IT); Valerio Michielan, Mogliano Veneto (IT); Luca Volpato, Preganziol (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/905,857

(22) Filed: Feb. 27, 2018

(65) Prior Publication Data

US 2018/0252390 A1    Sep. 6, 2018

(30) Foreign Application Priority Data

Mar. 1, 2017  (IT) .................. MI17A3131

(51) Int. Cl.

| | |
|---|---|
| *F21V 7/28* | (2018.01) |
| *F21V 8/00* | (2006.01) |
| *H01K 5/00* | (2006.01) |
| *H04B 10/116* | (2013.01) |
| *F21V 3/06* | (2018.01) |
| *F21V 19/00* | (2006.01) |

(Continued)

(52) U.S. Cl.
CPC ............... *F21V 7/28* (2018.02); *F21V 3/062* (2018.02); *F21V 19/0015* (2013.01); *F21V 23/06* (2013.01); *G02B 6/0021* (2013.01); *H01K 5/00* (2013.01); *H04B 10/116* (2013.01); *F21V 23/0442* (2013.01); *F21Y 2103/10* (2016.08); *F21Y 2115/10* (2016.08); *G02B 6/4298* (2013.01)

(58) Field of Classification Search
CPC ........ F21V 7/28; F21V 23/06; F21V 19/0015; F21V 3/062; F21V 23/0442; G02B 6/0021; G02B 6/4298; F21Y 2115/10; F21Y 2103/10; H01K 5/00; H04B 10/116
See application file for complete search history.

(56) References Cited

U.S. PATENT DOCUMENTS

2009/0129115 A1 * 5/2009 Fine .................... G02B 6/0021
    362/606
2012/0195598 A1 * 8/2012 Dunn ................. H04B 10/1141
    398/118

FOREIGN PATENT DOCUMENTS

| EP | 2754956 A1 | 7/2014 |
| WO | 2006131924 A2 | 12/2006 |
| WO | 2011027095 A1 | 3/2011 |

OTHER PUBLICATIONS

Italian Search Report based on application No. 102017000023131 (9 pages) dated Nov. 21, 2017 (for reference purpose only).

* cited by examiner

*Primary Examiner* — Kevin Quarterman
(74) *Attorney, Agent, or Firm* — Viering Jentschura & Partner mbB

(57) ABSTRACT

A lighting device, such as a LED module, comprising an elongated support structure having a longitudinal direction and electrically-powered light radiation sources distributed along the support structure, the support structure including at least one light-permeable layer, one or more optical signal sources coupled with the light-permeable layer, for injecting therein an optical signal propagating in the longitudinal direction, and one or more optical signal detectors coupled with the light-permeable layer, for detecting the optical signal injected by the optical signal source(s).

12 Claims, 1 Drawing Sheet

(51) Int. Cl.
*F21V 23/06* (2006.01)
*F21Y 103/10* (2016.01)
*F21Y 115/10* (2016.01)
*F21V 23/04* (2006.01)
*G02B 6/42* (2006.01)

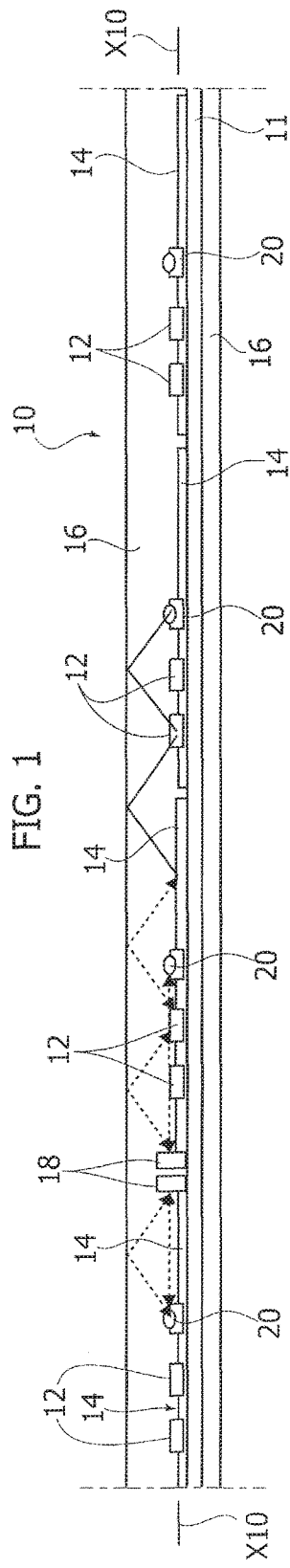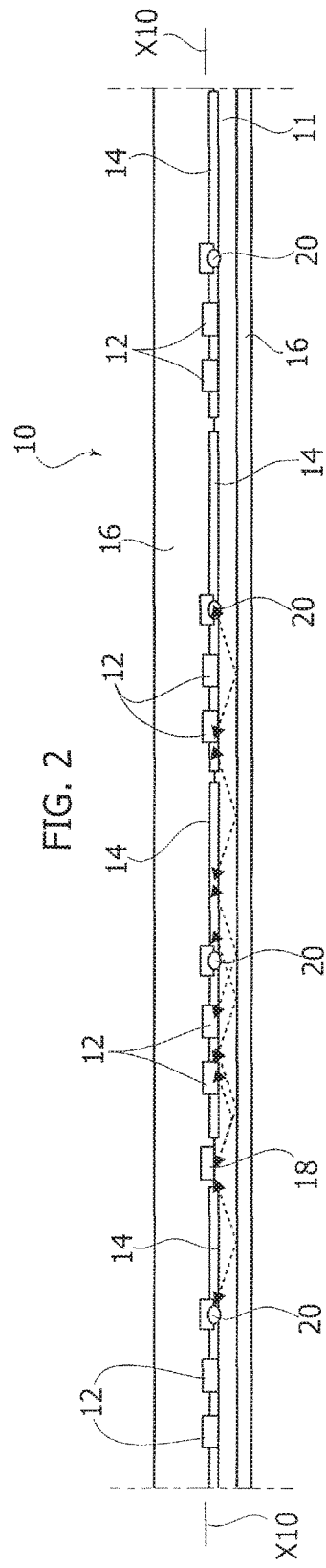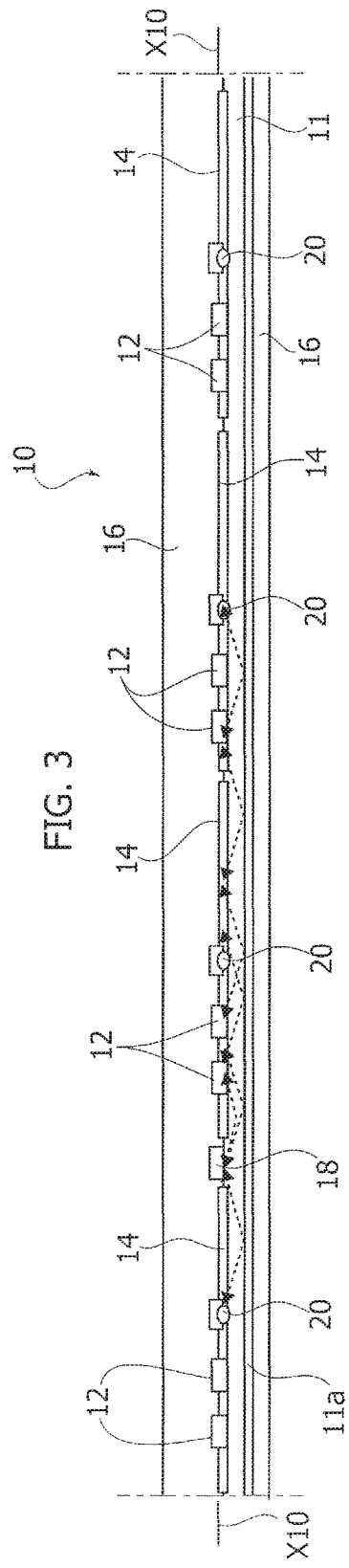

LIGHTING DEVICE AND CORRESPONDING METHOD

CROSS-REFERENCE TO RELATED APPLICATION

This application claims priority to Italian Patent Application Serial No. 102017000023131, which was filed Mar. 1, 2017, and is incorporated herein by reference in its entirety.

TECHNICAL FIELD

Various embodiments may generally relate to lighting devices.

One or more embodiments may refer to lighting devices employing electrically powered light radiation sources such as solid-state sources, e.g. LED sources.

BACKGROUND

In the lighting sector the use has spread of lighting modules adapted to be controlled by so-called light-engines, distributed along the length of the module (in the case of elongated linear modules) or on the area of the modules, e.g. with a plurality of driving circuits each of which controls a respective Single Electrical Unit (SEU).

Apart from the power supply, the elongated modules are not usually provided with a connection among the various SEUs, so that each unit operates independently, without accessing to information about the status of the previous or the following driving units.

In various applications, e.g. for smart lighting devices, it would be desirable to enable the various SEUs to communicate with each other, in order to share e.g. information about monitoring the status of the various SEUs distributed along the module and/or about the actions triggered by one or more sensors distributed along the length of the module.

In this respect, the proposal has been made to use smart components (such as microcontrollers or microprocessors) adapted to monitor the status of sensing elements and to consequently regulate the various light-engines.

Another approach has proposed the use of addressable linear lighting modules, wherein the various SEUs are sequentially connected via a common communication bus, which however is usually limited to a one-way information transmission.

In principle, the information may be transferred along the lighting module, specifically between the various Electronic Control Gear (ECG), by wireless communication systems (e.g. Wi-Fi, Bluetooth, . . . ) or by cabled communication systems (e.g. based on the DALI or I2C standards, or via serial protocols, etc.).

In most cases, such solutions envisage employing rather expensive smart components and a number of electrical connections, which may affect the product size by requiring e.g. the presence of wider substrates (e.g. Flexible Printed Circuits, FPCs) or multiple-layer substrates, with a negative impact on the cost due the need both of a higher amount of material for implementing the substrate and of more complex FPC structures.

SUMMARY

One or more embodiments may aim at providing advantageous solutions for sharing information along elongated lighting modules, e.g. without the need of employing smart components.

According to one or more embodiments, said object may be achieved with a lighting device having the features set forth in the claims that follow.

One or more embodiments may also refer to a corresponding method.

One or more embodiments may take advantage of the layered structure (practically a stack of different materials) of a linear lighting module (for example, but not necessarily, having a protection against the penetration of external agents, e.g. having an IP protection degree) in order to create at least one optical, e.g. short-range, communication channel.

In one or more embodiments, said system may be employed for sharing information along the length of the module, even in both directions, via optical signals and without affecting the performance of the lighting device.

One or more embodiments may envisage the use of at least one of said layers, so as to originate a structure substantially similar to an optical waveguide with total internal reflection.

When a wave coming from a first medium, having a high refractive index, impinges onto the boundary with another medium having a low reflective index, there exists a critical angle (known as angle of total internal reflection) above which the wave cannot pass through the surface, but rather is reflected in its entirety.

Such angle $\theta_{crit}$ may be expressed as:

$$\theta_{crit} = \sin^{-1}(n_{ext-medium}/n_{int-medium})$$

wherein $\sin^{-1}$ expresses the arcsin function, and $n_{ext-medium}$ as well as $n_{int-medium}$ denote the refractive indexes of both media, with $n_{ext-medium}$ referring to the more external material layer and with $N_{int-medium}$ referring to the more internal material layer.

This may enable transmitting information collected e.g. by a sensor and/or sharing basic information concerning the status of a plurality of SEUs along the module.

One or more embodiments may lead to the implementation of a communication channel among a plurality of SEUs within a linear lighting module, without affecting the normal lighting performance and/or the flexibility of the module. One or more embodiments lead to sharing basic information within the module with a minimum increase in the number of components, without requiring a smart component such as a microcontroller or a microprocessor (and the related software) and/or a communication bus.

In one or more embodiments:
- a transparent potting material may be used as an optical waveguide, in order to transmit basic information (e.g. the on/off state of a certain SEU) or optionally more complex information (enabling a digital communication between smart lighting sources) within a certain range along a lighting module, without the need of resorting to additional electrically conductive (e.g. copper) lines, which may have a negative impact both on the size and on the complexity of the circuit,
- the related communication system may be implemented with a low number of components, e.g. with an infrared proximity sensor and an infrared LED for transmitting the infrared lighting radiation, and with a switch (e.g. a MOS or a similar component) for each controlled SEU,
- the transparent material of the waveguide may include, without originating additional costs, the potting material which is already present in order to impart a protection, e.g. an IP degree protection, to the module, by resorting to signal encoding techniques (e.g. via modulation) a certain receiver may be adapted to manage a plurality of signals coming from different locations within a lighting module.

In one or more embodiments:
- a substrate, e.g. a Flexible Printed Circuit (FPC) with a transparent layer may be used as an optical waveguide, for sending basic information (e.g. the on/off state of a certain SEU) or optionally more complex information (enabling a digital communication between smart lighting sources) within a certain range along a lighting module, without the need of resorting to additional electrically conductive (e.g. copper) lines, which may have a negative impact both on the size and on the complexity of the circuit,
- the transmission may take place without the need of taking into account the spectrum of the light radiation emitted by the light radiation sources of the lighting module, because the signals/information transmitted optically in the substrate do not interact physically with the front or upper side of the lighting module (e.g. far infrared, infrared, visible, ultraviolet, . . . ),
- in this case, again, the number of components required to implement the communication system is low, e.g. with an infrared proximity sensor and an infrared LED for transmitting the infrared light radiation, and with a switch (e.g. a MOS or a similar component) for each controlled SEU,
- the solution may be used both on bare and on protected modules,
- the presence of a coating or of tracks (e.g. electrically conductive lines already present in various linear, e.g. flexible, modules), in combination with the optical waveguide, may lead to a higher efficiency, thus achieving a wider communication range with the same signal.

BRIEF DESCRIPTION OF THE FIGURES

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 is a longitudinal section of one or more embodiments,

FIG. 2 is a longitudinal section of one or more embodiments, and

FIG. 3 is a longitudinal section according to one or more embodiments.

DETAILED DESCRIPTION

In the following description, various specific details are given to provide a thorough understanding of various exemplary embodiments according to the present specification. The embodiments may be practiced without one or several specific details, or with other methods, components, materials, etc. In other instances, well-known structures, materials or operations are not shown or described in detail in order to avoid obscuring the various aspects of the embodiments. Reference throughout this specification to "one embodiment" or "an embodiment" means that a particular feature, structure, or characteristic described in connection with the embodiment is included in at least one embodiment.

Thus, the possible appearances of the phrases "in one embodiment" or "in an embodiment" in various places throughout this specification are not necessarily all referring exactly to the same embodiment. Furthermore, particular features, structures, or characteristics may be combined in any suitable manner in one or more embodiments.

The headings provided herein are for convenience only, and therefore do not interpret the extent of protection or scope of the embodiments.

In the Figures, reference 10 generally denotes an elongated lighting device, having a lengthwise extension denoted as X10, e.g. of the so-called "flex" type.

In the present case, device 10 may be considered as having indefinite length, being adapted in one or more embodiments to be cut to length according to the application and usage needs.

In one or more embodiments, device 10 may include a ribbon-shaped support element or substrate 11, e.g. a so-called FPC (Flexible Printed Circuit).

In one or more embodiments, substrate 11 may have a front side (or upper side, above in the Figures) whereon there are distributed light radiation sources 12. In one or more embodiments, these sources may include electrically powered, e.g. solid-state, light radiation sources, such as LED sources.

Sources 12 may be connected to electrically conductive formations 14 (e.g. lines of a metal material such as copper or aluminium), adapted to extend e.g. along the front or upper side of support 11, which perform the function of supplying power to, and optionally controlling, the light radiation sources 12.

In one or more embodiments, said sources may be divided into a plurality of units, which may be named Single Electrical Units (SEUs).

In the Figures, the nature of such units is exemplified, in a deliberately schematic representation, by illustrating lines 14 as divided into a plurality of sections: of course, such a representation is merely exemplary because, in one or more embodiments, lines 14 may be implemented in such a way as to favour electric continuity (e.g. for the supply of sources 12) along the extension direction of device 10.

Apart from what will be described in further detail in the following, the presently considered kind of devices/modules is to be considered known in the art, which makes it unnecessary to provide a more detailed description herein.

Another well-known aspect is that such modules may be implemented, in one or more embodiments;
- either as bare modules, i.e. having the sources 12 and the electrically conductive formations 14 on support 11 exposed to the outside,
- or as protected modules, coated with a potting mass 16 including e.g. a plastic material (for instance polyurethane) or a light-permeable silicone material.

Said potting mass 16 may include a sort of protective sheath, which protects the module against the penetration of external agents (moisture, various particles, etc.) e.g. by imparting an IP degree protection.

One or more embodiments as exemplified in FIG. 1 may employ the potting mass 16 (e.g. the layer covering the front or upper face of the module), which is adapted to have a refractive index higher than the surrounding air, in order to originate an optical waveguide which may be used for transmitting optical signals in the lengthwise direction (axis X10) of module 10.

In one or more embodiments, support 11 may therefore host one or more sources 18 (e.g. infrared LEDs) of an optical signal, which may be injected into the waveguide formed by layer 16. Said optical signal is adapted to propagate along the length of module 10, so as to be sensed by one or more photodetectors 20 arranged on substrate 11.

FIG. 1 exemplifies the possibility of using two sources 18 oriented in opposite directions, so as to be able to transmit, along axis X10, optical signals directed in opposite directions (leftwards and rightwards, with reference to the viewpoint of FIG. 1) and adapted to be sensed by photodetectors 20 arranged either in the same or in other SEUs of the module.

By using either a source 18 emitting the optical signal in one direction or a plurality of sources 18 emitting the optical signal in opposite direction, it is possible to obtain a signal transmission along the waveguide including layer 16, even when (as may occur in current applications) layer 10 is bent or twisted.

For example, if the potting mass 16 includes a silicone material (having a refractive index n approximately amounting to 1.41), the angle of total internal reflection has an approximate value of 45.2°. If the potting mass 16 includes a material such as polyurethane (n=1.5), said angle approximately amounts to 41.8°.

The sources 18 may include, for example, LEDs emitting either in the infrared range (far infrared, near infrared) or in the ultraviolet range, i.e. in a spectrum of electromagnetic radiation other than the spectrum (normally the visible spectrum) of the radiation emitted by the sources 12, i.e. the lighting sources. In this way, the transmission of the optical signal between the source(s) 18 and the detector(s) 20 may take place without interfering with the lighting action of module 10.

Therefore, it will be appreciated that, as used herein, the adjective "optical" (referring e.g. to the signal propagating along layer 16) is by no means to be construed as limited to the visible range.

One or more embodiments may employ one or more detectors 20 (e.g. infrared sensors, proximity sensors, etc.) arranged at different distances along module 10, offering therefore the possibility of acting correspondingly (e.g. via one or more locally driven switches) in those regions (in practice, in each SEU) wherein the signal is received.

The distance useful for the optical communication as previously outlined may be linked to factors such as:
 the efficiency of the waveguide formed by layer 16 (the portion of light undergoing total internal reflection),
 the transmittance and the absorbance (in practice, attenuation) of the optical radiation by the light-permeable material of layer 16,
 the wavelength used for transmitting the optical signal,
 the beam opening angle of source(s) 18,
 the possible reflection effect by the upper surface of support 11, wherein the electrically conductive formations 14 (e.g. of a metal material such as copper) may induce a certain mirror reflection, so as to favour the transmission of light along layer 16,
 the number of components (e.g. the circuits associated with sources 12) in the module: said components may absorb (e.g. if they are provided with a dark, e.g. black, package) a certain fraction of the transmitted light.

An optical communication channel as exemplified herein may exhibit high flexibility: for example, it is possible to use a plurality of sources 18 at different positions of module 10, the single detectors 20 being adapted to distinguish, or at any rate to manage, the signals coming from different sources.

For example, if sources 18 emit a continuous optical signal, a single detector (sensor) 20 may be adapted to receive a plurality of optical components from different directions (e.g. from two sources 18) and to be triggered (e.g. by driving a switch) as soon as a given threshold has been reached.

More generally, by using modulated sources 18, the transmitted signal may be imparted an individual characterization (e.g. it may be customized, by employing different modulations, different widths, different delays) so as to enable each detector 20:
 to receive individual signals without interference, and/or
 to identify which source, among a plurality of sources 18 arranged along module 10, has emitted a given signal.

FIGS. 2 and 3 exemplify embodiments wherein substrate 11 may be employed as an optical waveguide for the communication along module 10.

In one or more embodiments, substrate 11 may include a light permeable material, such as polyethylene terephthalate (PET), polyethylene naphthalate (PEN), transparent polyimide (PI) or flexible glass.

Also in this case, it is possible to take advantage of the difference in the refractive indexes of air (usually having a low refractive index) and of the transparent substrate (having a higher refractive index), so as to originate an optical waveguide which may be used for transmitting the signals along module 10 in the direction of axis X10.

Such an option may be adopted also in the case of module 10 being a bare module, i.e. without potting mass 16.

On the other hand, solutions as exemplified in FIG. 2, which comprise, in addition to the substrate 11 of a light permeable material, also a potting mass 16 of a light permeable material, may lead to obtaining, within module 10, two possible optical waveguides adapted to be used also independently from each other.

At any rate, the optical waveguide implemented via a light permeable substrate 11 enables the transmission of short-range optical signals, the possibility being offered of sending both basic information (e.g. the on/off state of a SEU) and more complex information.

In one or more embodiments, the light radiation source(s) (e.g. infrared LEDs) may emit their radiation towards substrate 11 (i.e. downwards, with reference to the viewpoint of FIGS. 2 and 3) with a diverging beam (i.e. with a wide beam opening angle) so as to overtake the angle of total internal reflection at least with a significant fraction of the emitted light power.

As a consequence, the optical signal (and the information associated thereto) may be injected in opposite directions into the material of substrate 11, even from one source 18. At the same time, the characteristics of signal transmission are preserved even when module 10 is bent or twisted.

With reference to the previously mentioned materials, it may be observed that:
 for PEN (n=1.5), the angle of total internal reflection approximately amounts to 41.8°,
 for PET (n=1.49), the angle of total internal reflection approximately amounts to 42.2°,
 for transparent PI (n=1.68), the angle of total internal reflection approximately amounts to 36.5°, and
 for flexible glass (n=1.47), the angle of total internal reflection approximately amounts to 42.9°.

The signal emitted by one or more sources 18 may therefore be detected by one or more sensors 20 (e.g. an infrared sensor or a proximity sensor) located at different distances, the consequent possibility being given of acting (e.g. by driving a switch) on the single SEUs where the signal is received.

In one or more embodiments, the source 18 and the detectors 20 may be mounted on the front side of substrate 11 (where sources 12 are located), the possibility being given, as they are mounted downwards, of projecting the light radiation into substrate 11 and of capturing the light radiation propagating along substrate 11.

Also in this case, the transmission range may depend on different factors, such as:
- the efficiency of the waveguide formed by substrate 11 (the portion of light undergoing total internal reflection),
- the transmittance and the absorbance (in practice, the attenuation) of substrate 11,
- the wavelength used for transmitting the optical signal,
- the beam opening angle of source(s) 18,
- a possible reflection effect by the side of the electrically conductive formations 14 facing towards substrate 11,
- the structure of substrate 11 itself, because the areas without electrically conductive formations 14 may form points of loss of the transmitted optical signal.

In one or more embodiments as exemplified in FIG. 2 (and in FIG. 3), the optical waveguide formed in substrate 11 is physically distinct from the portion of device 10 where the propagation of the lighting radiation from sources 12 takes place. The optical signal transmitted within substrate 11 may therefore also have a wavelength at least marginally corresponding to the spectrum of the light radiation emitted by the lighting sources 12.

Also in this case, in the presence of a plurality of sources 18, the detector(s) may be adapted to manage the signals transmitted by a plurality of sources, for example.

For example, if the source(s) 18 emit a continuous optical signal, a single detector (sensor) 20 may be adapted to receive a plurality of optical components from different sources, in different directions, and may be adapted to be triggered (e.g. by driving a switch) when a predetermined threshold has been reached.

More generally, if modulated sources 18 are used, it is possible to impart to the transmitted signal an individual characterization (e.g. by customizing it through the use of different modulations, different widths, different delays), so that the individual detector 20 is adapted to receive a plurality of signals without mutual interferences, and/or to identify which source, among the various sources 18 arranged along module 10, has emitted a certain signal.

One or more embodiments, as exemplified in FIG. 3, may envisage the presence of a coating 11a of a light reflective material (e.g. a metal material such as copper or aluminium) on the side of substrate 11 opposite the side hosting sources 12.

The layer 11a may increase the efficiency of the waveguide formed in substrate 11 by performing a mirror-like reflection of the light radiation.

In one or more embodiments, as exemplified in FIG. 3, the optical waveguide formed in substrate 11 acts as a sort of guide tube for the light radiation, wherein:
- the upper side has a reflecting action, due to the electrically conductive formations 14 (e.g. of a metal material such as copper or aluminium) provided on the front or upper side of substrate 11, and
- the lower side takes advantage of the reflective effect of layer 11a.

In one or more embodiments, a lighting device (e.g. 10) may include:
- an elongated support structure (e.g. 11, 16) having a longitudinal direction (e.g. X10) and electrically-powered light radiation sources (e.g. 12) distributed along the support structure, wherein the support structure includes at least one light-permeable layer (substrate 11 and/or protection layer 16),
- at least one optical signal source (e.g. 18) coupled with the at least one light-permeable layer, for injecting into the at least one light-permeable layer an optical signal propagating along the at least one light-permeable layer in said longitudinal direction, and
- at least one optical signal detector (e.g. 20) coupled with the at least one light-permeable layer, for detecting the optical signal injected into the at least one light-permeable layer by said at least one optical signal source.

In one or more embodiments, said at least one light-permeable layer may include a protection layer applied onto said electrically-powered light radiation sources.

In one or more embodiments, said at least one light-permeable layer may include a substrate onto which said electrically-powered light radiation sources are arranged.

In one or more embodiments, said at least one light-permeable layer may be provided with a light-reflective coating (e.g. 11a).

In one or more embodiments, said substrate may include:
- a first surface for mounting said electrically-powered light radiation sources, said first surface having electrically conductive formations (e.g. 14) which are at least partly light-reflective, and
- a second surface, opposed said first surface, having a light-reflective coating.

In one or more embodiments:
- said electrically-powered light radiation sources emit light radiation in a first region of the electromagnetic spectrum, and
- said at least one optical signal source may emit optical signals in a second region of the electromagnetic spectrum, said second region being different from said first region.

One or more embodiments may include a plurality of said optical signal sources configured for emitting optical signals selected out of:
- continuous optical signals, and
- modulated optical signals, preferably having modulation characteristics different from source to source.

In one or more embodiments:
- said electrically-powered light radiation sources may include solid-state, optionally LED-type light radiation sources, and/or
- said support structure may be flexible.

In one or more embodiments, a method of providing lighting devices may include:
- providing an elongated support structure having a longitudinal direction, with electrically-powered light radiation sources distributed along the support structure, wherein the support structure includes at least one light permeable layer,
- coupling with the at least one light permeable layer at least one optical signal source (18), for injecting into the at least one light permeable layer an optical signal propagating along the at least one light permeable layer in said longitudinal direction, and
- coupling with the at least one light permeable layer at least one optical signal detector, for detecting the optical signal injected into the at least one light permeable layer by said at least one optical signal source.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting device comprising:
an elongated support structure having a longitudinal direction and electrically-powered light radiation sources distributed along the support structure, wherein the support structure includes at least one light-permeable layer,
at least one optical signal source mounted along the support structure and coupled with the at least one light-permeable layer, configured for injecting into the at least one light-permeable layer an optical signal undergoing total internal reflection propagating along the at least one light-permeable layer in said longitudinal direction, and
at least one optical signal detector arranged along the support structure and coupled with the at least one light-permeable layer, configured for detecting the optical signal injected into the at least one light-permeable layer by said at least one optical signal source.

2. The lighting device of claim 1, wherein said at least one light-permeable layer includes a protection layer applied onto said electrically-powered light radiation sources.

3. The lighting device of claim 1, wherein said at least one light-permeable layer further comprises a substrate onto which said electrically-powered light radiation sources are arranged.

4. The lighting device claim 1, wherein said at least one light-permeable layer is provided with a light-reflective coating.

5. The lighting device of claim 3, wherein said substrate comprises:
a first surface for mounting said electrically-powered light radiation sources, said first surface having electrically conductive formations which are at least partly light-reflective, and
a second surface, opposed said first surface, having a light-reflective coating.

6. The lighting device claim 1, wherein:
said electrically-powered light radiation sources emit light radiation in a first region of the electromagnetic spectrum, and
said at least one optical signal source emits optical signals in a second region of the electromagnetic spectrum, said second region being different from said first region.

7. The lighting device of claim 1, further comprising a plurality of said optical signal source configured for emitting optical signals selected out of:
continuous optical signals, and
modulated optical signals.

8. The lighting device of claim 1, wherein:
said electrically-powered light radiation sources include solid-state and/or
said support structure is flexible.

9. The lighting device of claim 7, wherein the modulated optical signals have modulation characteristics different from source to source.

10. The lighting device of claim 9, wherein the sources are modulated sources.

11. The lighting device of claim 8, wherein the electrically powered light radiation sources include LED type light radiation sources.

12. A method of providing lighting devices, the method comprising:
providing an elongated support structure having a longitudinal direction and electrically-powered light radiation sources distributed along the support structure, wherein the support structure includes at least one light permeable layer,
coupling with the at least one light permeable layer at least one optical signal source mounted along the support structure for injecting into the at least one light permeable layer an optical signal undergoing total internal reflection propagating along the at least one light permeable layer in said longitudinal direction, and
coupling with the at least one light permeable layer at least one optical signal detector arranged along the support structure for detecting the optical signal injected into the at least one light permeable layer by said at least one optical signal source.

* * * * *